United States Patent [19]

Bogren

[11] 4,314,511
[45] Feb. 9, 1982

[54] TRANSPORT DEVICE MAINLY INTENDED FOR PULLING TREE TRUNKS AND SIMILAR LOADS

[76] Inventor: Leif Bogren, Radavägen 59, Mölndal, Sweden, 431 36

[21] Appl. No.: 64,987

[22] Filed: Aug. 9, 1979

[30] Foreign Application Priority Data

Aug. 24, 1978 [SE] Sweden ............................... 7808923

[51] Int. Cl.³ .............................................. B66C 21/00
[52] U.S. Cl. ............................................ 104/173 R
[58] Field of Search ................. 104/162, 163, 173, 89, 104/112, 114, 116, 173 R; 198/202; 105/218, 128

[56] References Cited

U.S. PATENT DOCUMENTS

| | | | |
|---|---|---|---|
| 3,566,801 | 3/1971 | Ashvrst | 104/173 R |
| 3,743,278 | 7/1973 | Rixen | 104/173 R |
| 3,769,916 | 11/1973 | Hogan | 104/173 R |
| 3,807,577 | 4/1974 | Bell | 104/173 R |

Primary Examiner—Richard A. Bertsch
Attorney, Agent, or Firm—Holman & Stern

[57] ABSTRACT

A transport device for moving a load, e.g. tree trunks from one point to another, and comprising a pull band (3) extending between these two points, one end of the band being connected to a winch (2) and the other to a support (9) by a resilient member (4). The winch gives the band a reciprocating motion in its longitudinal direction which moves one or more holding members (5) releasably attached to the band (3). The loads are connected to the holding members. The holding member (5) comprises a casing (12) slotted in its longitudinal direction, the width of the slot (18) exceeding the thickness of the band and said casing being provided with means (20) for preventing an unintentional passage of the band through the slot. The holding member (5) and/or the band (3) is provided with locking members (16) arranged to lock the holding member relative to the band in one of the directions of motion and to release the band in the opposite direction of motion. A releasing member (23) is arranged at an optional place along the band, said releasing member against the action of said means (20) displaces the band out of the holding member (5) through the slot (18).

10 Claims, 17 Drawing Figures

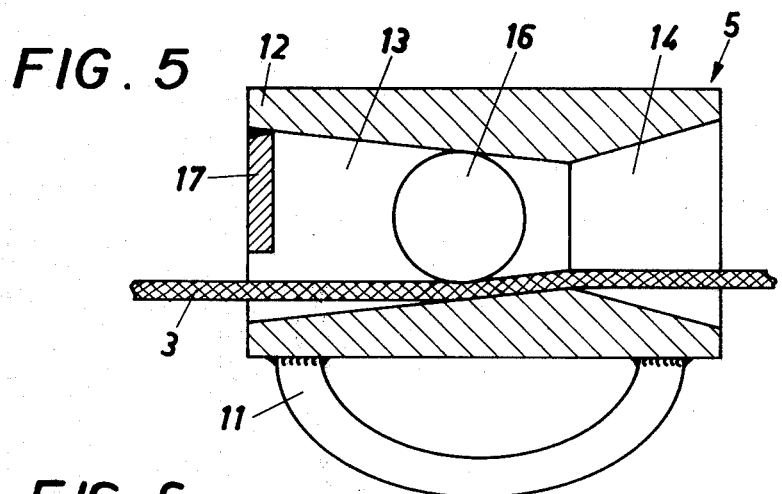
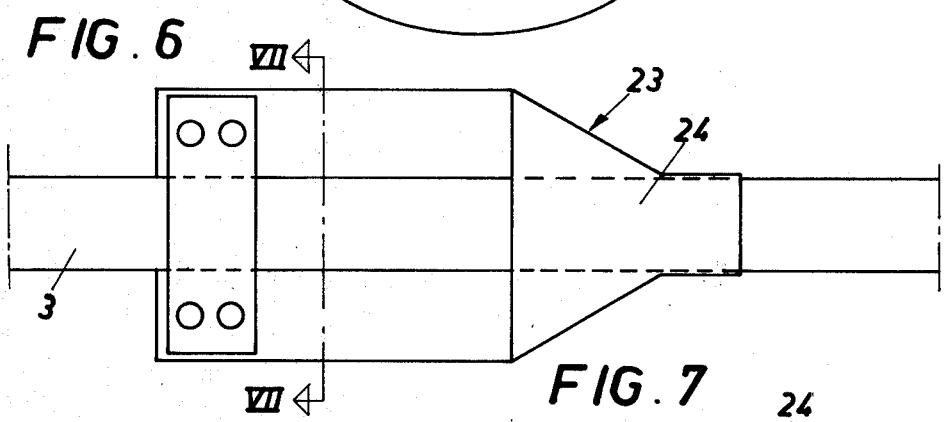
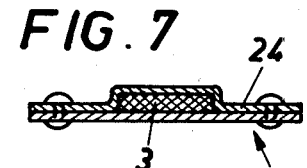
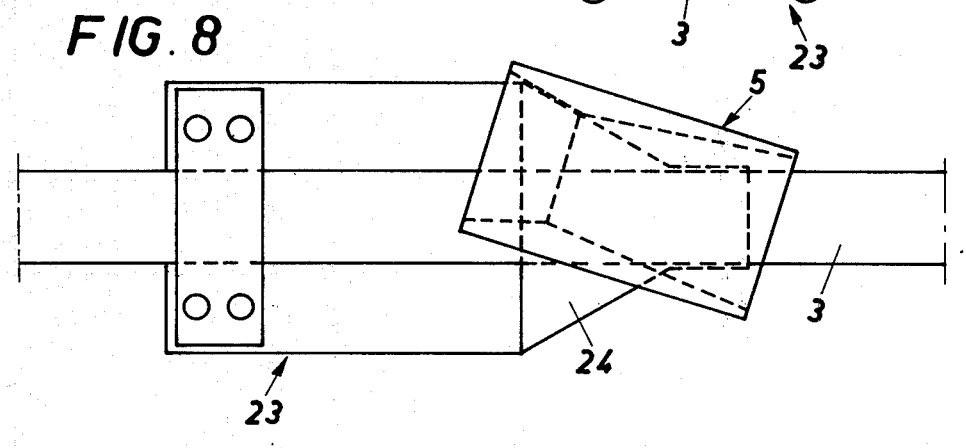

TRANSPORT DEVICE MAINLY INTENDED FOR PULLING TREE TRUNKS AND SIMILAR LOADS

BACKGROUND OF THE INVENTION

The present invention refers to a transport device for transporting a load, e.g. tree trunks, along an elongated element extending along the transport distance and the load being released at an optional place, said elongated element by means of a driving source being given a reciprocating movement in its longitudinal direction, and at least one holding member being attached to the elongated element, said holding member being arranged to bring along the load in one of the directions of motion of the elongated element and in the opposite direction of motion skip on the elongated element without transferring the load.

In forestry work the transport of cut tree trunks to a road, which is passable by big transport vehicles, is often a problem. This problem is today solved in many different ways. One way is having a cross-country forwarder or wheel tractor transporting the tree trunks to the road.

This is however not always the most convenient procedure, e.g. when only certain trees have been cut in thinning or the like, and other trees are left. These remaining trees interfere considerably with forwarders and similar vehicles.

A winch, e.g. mounted on a timber truck, is another alternative. When the tree trunks, which often are sporadically placed over a large area and at different distances from the road, are trailed to the road and loaded on the transport vehicle, the wire is manually drawn from the winch to the tree trunk, to which the wire is connected.

The distance from the winch to the tree trunk is however limited to the length of the wire, which often is insufficient. The manual drawing of the wire to a new tree trunk after each trailing of another tree trunk is a time- and work consuming procedure, which also increases the costs for loading and transport.

PRIOR ART

In U.S. Pat. No. 3,566,801 a transport device is described, which comprises a wire or a rope extending between two supporting means, means for oscillating the rope in the direction of its length with a very low amplitude (about 6 mm at a frequency of 50 vibrations per second) and a carriage, which by way of a holding device is connected with and driven by and along said rope.

This transport device cannot be used for the purpose for which the present invention is intended. Firstly the amplitude of the oscillating movement of the rope is too low for trailing tree trunks, considering the self-elongation of the rope. Great forces are required for the trailing of tree trunks and said forces tend to temporarily elongate the rope. Secondly, a holding device comprising shafts, teeth and toothed wheels cooperating with pawls or similar devices, is not sufficiently reliable and durable for use in forestry, where such a device has to withstand rugged handling, and impurities as e.g. soil, stones, springs, twigs, ice and very low temperatures. Moreover, since great tractive forces have to be applied to the rope, it is also very important that the holding device can produce a complete locking in one of the directions of motion of the rope and at the same time be easily loosened in the opposite direction of motion, which has proved to be very difficult to achieve.

In the Swedish printed publication No. 7409119-0 a warping system is described having an endless wire and shifting means in front of the pulley wheels of the wire, the shifting means moving jaw means from the incoming to the outgoing wire part. The jaw means require an exact guiding to the shifting units, which is very difficult to achieve, and since the jaw means have a clamping effect only in loaded condition, a safe return of the jaw means cannot be guaranteed. The system comprises many units cooperating with each other and each comprising a number of moveable parts, which in forest areas, where sand, gravel etc. easily can come into contact with the structural members after a short time, are put out of operation.

Also, clamping devices of different kinds are previously known, e.g. through the British Pat. No. 651,556, which lock the wire in one of the directions of motion of the wire and in the opposite direction of motion release the wire. In order to provide an effective locking it is required that the angle or taper of the clamping wedge is small, which however means that for releasing the wire a great force is required, which can not be achieved by means of a spring, elastic band or similar.

BRIEF SUMMARY OF THE INVENTION

The purpose of the present invention is to eliminate the above mentioned drawbacks and to provide a simple and reliable transport device, which facilitates the trailing of tree trunks, reduces the transport costs and the holding members of which comprise no, or only a few, moveable parts, which withstands rugged handling, coarse impurities and cold, which fulfils the demand of providing an effective locking of the band and which can take up very great loads and at the same time is very easy to loosen.

By virtue of the fact that the transport device can be used in very rough country and environment, it can also be used for military purposes to transport ammunition, supplies and/or injured persons. The invention has for this purpose been so arranged that it can maintain transport in both directions between two or more points which are relatively large distances apart and even across lakes, watercourses etc.

This is according to the invention achieved by the fact that the holding member comprises a longitudinally slotted or axially divisable casing provided with means for preventing an unintentional passage of the elongated element through the slot or for locking the parts of the casing relative to each other, that the holding member and/or the elongated element is provided with locking members arranged to lock the holding member relative to the elongated element in one of its directions of motion and to release the elongated element in its opposite direction of motion, and that a releasing member is attached at an optional position along the elongated element, said releasing member being arranged to displace the elongated element out of the holding member through the slot or through the open casing respectively against the action of said means.

BRIEF DESCRIPTION OF THE SEVERAL VIEWS OF THE DRAWINGS

Some embodiments of the invention will now be described with reference to the accompanying drawings.

FIG. 5 is a longitudinal section through the holding member of FIG. 3 taken along line V—V of FIG. 4, FIG. 6 is a top plan view of a releasing member, FIG. 7 is a cross-section through the releasing member according to FIG. 6 taken along line VII—VII, FIG. 8 illustrates a working moment when a holding member is released.

DETAILED DESCRIPTION

Figure 1:
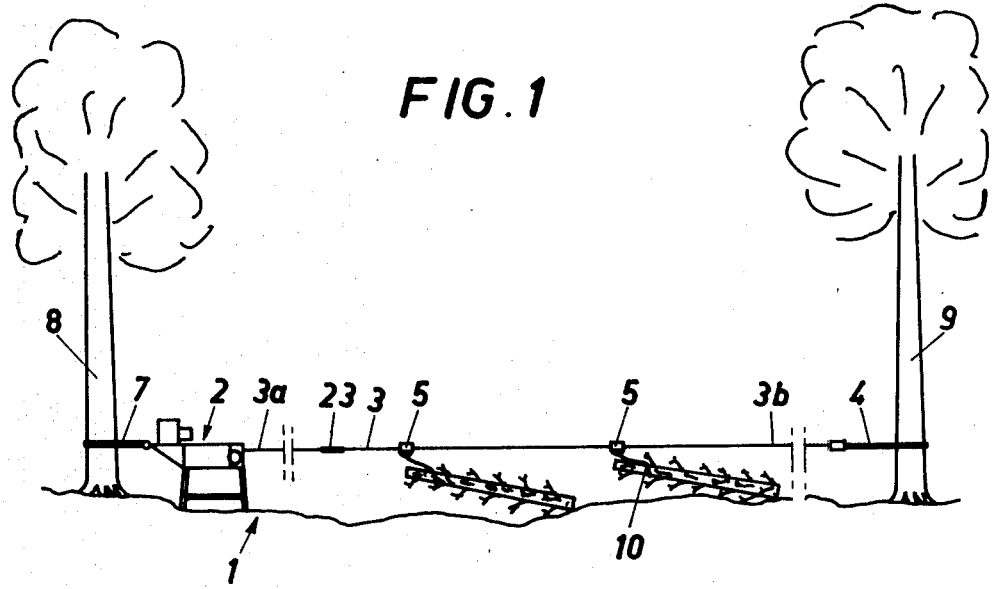
FIG. 1 is a schematic side view of the transport device according to the invention.
Figure 2:
FIG. 2 is a top view of the transport device according to FIG. 1.

The transport device 1 comprises mainly a winch 2 driven by a driving means, a pull band 3, a flexible element 4 and at least one, preferably a plurality, of holding members 5 intended to be attached on the pull band 3.

The driving means is preferably a hydraulic motor of conventional kind, but can of course as well be an electric motor a pneumatic motor or an explosion motor. The band 3 is by the winch 2 given a reciprocating motion, the amplitude of which can be varied within broad limits, but should at least exceed some decimeters in order to have the transport device working satisfactory. Practical tests have shown that a reciprocating motion with an amplitude between 1-10 and up to 30 meters is particularly favourable. The winch 2 is provided with a fixing device 7, by means of which it can be connected to a support 8, e.g. a tree, a vehicle or similar structure.

The band 3 preferably comprises a woven, flat strip with a low self-elongation, e.g. made from synthetic textile material. The band 3, which has a substantially square cross-section, has several advantages, which will be mentioned later.

The end of the band 3 facing the winch 2, the so called driving end 3a, is connected to the winch drum and the opposite end of the band, the coupling end 3b, is connected to a further support 9, e.g. a tree, by way of a flexible element 4. This flexible element can e.g. consist of a rubber member, a spring-loaded wire or one or more tension springs, and exerts a substantially uniform tractive force in the coupling end 3b of the band 3 and opposed to the tractive force exerted by the winch. The tractive force of the flexible element 4 is much smaller than the tractive force exerted by the winch 2 and its only purpose is to keep the band 3 stretched and to pull the band towards the support 9, when the winch 2 after having hoisted in a predetermined length of the band slackens it again. The band 3 is thus given a reciprocating motion along its entire length, the force of which in the direction towards the winch is sufficient for moving one or more tree trunks or another load.

The holding member 5 must be effectively locked to the band in the transport direction and release the band at the return motion thereof, in order to have the load—the tree trunks—moved in the transport direction of the band.

Figure 3:
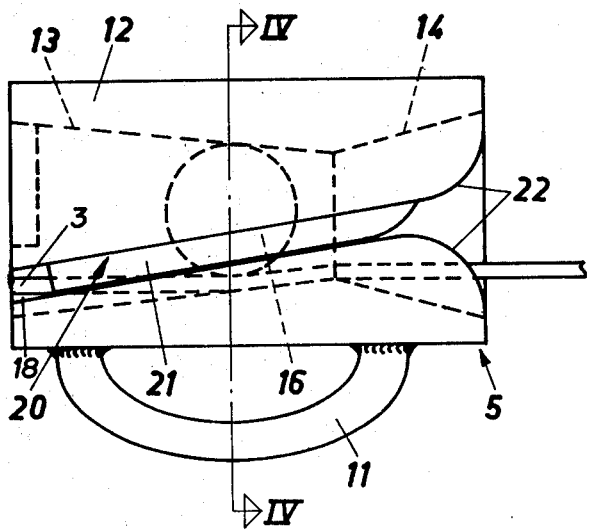
FIG. 3 is a side view of a holding member.
Figure 4:
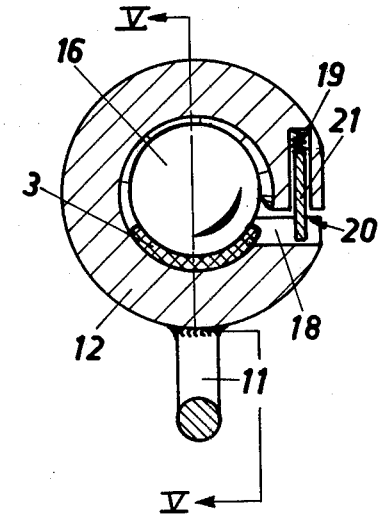
FIG. 4 is a cross-section through the holding member taken along line IV—IV of FIG. 3.

The holding member 5 according to the embodiment shown in FIGS. 3-5 comprises a cylindrical casing 12 of steel, on the underside of which a loop 11 is arranged for connection of the object to be transported. The cylindrical casing 12 is provided with a first 13 and a second 14 tapered recess extending from the respectively end portions of the casing 12 inwardly towards the central part of the casing, where the recesses 13 and 14 meet and form a free passage through the casing 12. This free passage has a substantially circular cross-section and has a diameter somewhat smaller than that of a locking member 16, e.g. a ball, placed therein. The first tapered recess 13 is somewhat larger than the second recess 14, so that the locking ball 16 is given enough free space and for providing a suitable taper. This is important as the locking ball 16 is intended to lock the band 3 extending through the holding member 5 and the tapered recesses 13, 14 by wedge action. A part circular end wall 17 is attached at the opening of the first tapered recess 13 and is arranged to prevent the locking ball 16 from falling out of the holding member 5.

The holding member 5 is provided with means for enabling a simple engagement and disengagement of the holding member 5 to and off the band 3. This is achieved by a longitudinal slot 18 extending along one side of the holding member 5. The holding member is further provided with means 20 preventing the band 3 from leaving the cylinder through the slot 18 in other cases than when a special releasing device is in its way. The slot 18 is according to this embodiment blocked by a spring-actuated 19 slide 21, which is displaceably arranged in the cylinder 12.

The front edge of the slide 21, as seen in the direction of motion (to the right according to FIG. 3), is somewhat chamferred as well as the guiding edges 22 of the slot 18. This facilitates the engagement and disengagement of the holding member 5 on the band 3.

A releasing member 23 (FIGS. 6-8) is preferably arranged close to the driving end 3a of the band for providing an automatic releasing of the holding member 5 and the load connected thereto. The releasing member 23 preferably comprises a piece of sheet metal fixed to the band 3, e.g. by means of a screw union or similar fastener and comprises a substantially flat taper portion 24, which is arranged to partly extend into the slot 18 of the holding member 5 from the front and displace the slide 21 to an open position. By the action of the taper portion 24 of the releasing member 23 the holding member 5 is displaced sideways (FIG. 8) and off the band 3, at which the holding member 5 and the load connected thereto can be taken care of manually.

Also other types of releasing members 23 can be used, e.g. they can be made of the same material as the band 3 and even be made integral with the band.

Figure 9:
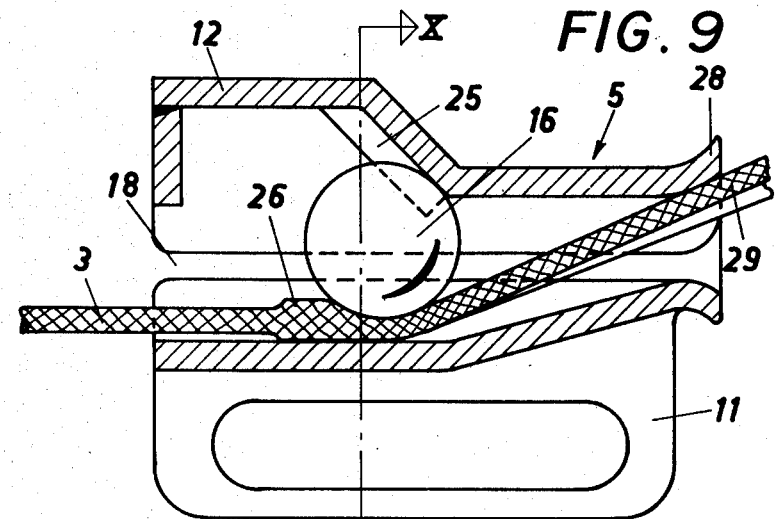
FIG. 9 is a longitudinal section through an alternative embodiment of a holding member.
Figure 10:
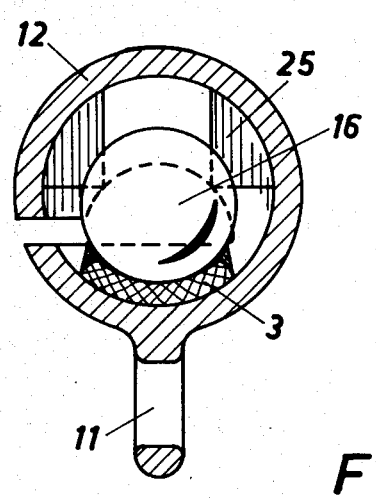
FIG. 10 is a sectional view taken along line X—X of FIG. 9.
Figure 11:
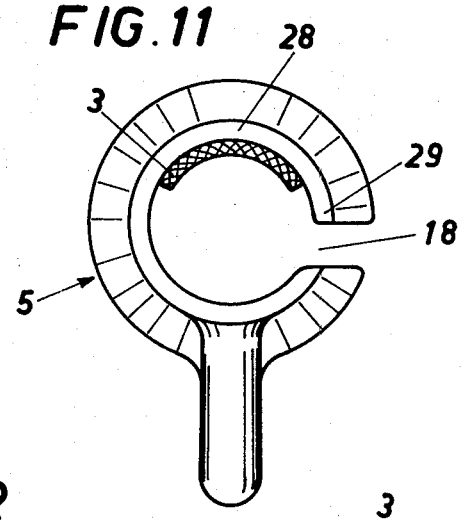
FIG. 11 is a right end view of the holding member according to FIG. 9.
Figure 12:
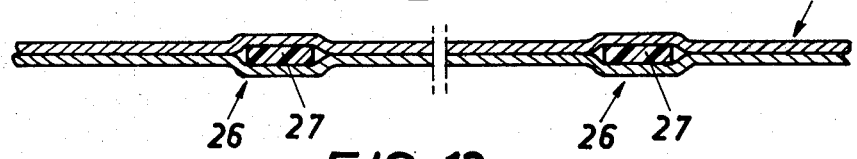
FIG. 12 is a longitudinal section through a pull band according to the invention.
Figure 13:
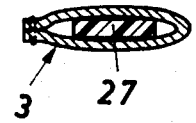
FIG. 13 is a cross-section through the pull band taken along line XIII—XIII of FIG. 12, FIGS. 14 and 15 show a further embodiment of a holding member with the pull band in two different positions.

In FIGS. 9-11 is shown a modified embodiment of the holding member 5, which differs from the embodiment described above by the fact, that the tapered recess of the casing 12 and the angle of the surface 25 cooperating with the locking member 16 is considerably steeper, at which a considerably greater wedging effect of the locking member is achieved, but on the other hand a releasing of the band 3 without substantial tensile forces. The effective wedging of the band in the holding member has been achieved by the fact that the band 3 is provided with fixed raised portions 26, preferably consisting of rubber blocks 27 arranged in the textile band 3. When a raised portion of the band 3 contacts the locking member 16 an effective locking of the band is achieved without wedging the locking member 16 against the inclined surface 25. This is preferably curved in accordance with the radius of curvature of the locking ball 16.

Unlike the embodiment of FIGS. 3-5 the slot 18 is permanently open and the member 20, which shall prevent the band 3 from leaving the holding member 5 through the slot 18, comprises partly a curved end portion 28, at one of the openings of the casing 12 and partly an extended portion 29, at which the slot 18 within this opening portion will be located at the lower edge of the outlet. The curved portion 28 causes the band 3 to be curved in its longitudinal direction when it leaves the holding member and thus obstructs the band from "slipping" out through the slot 18.

There is only one moving part, namely the locking member 16, in this whole holding member construction, at which the reliability is very high even under very unfavourable conditions.

Figure 14:
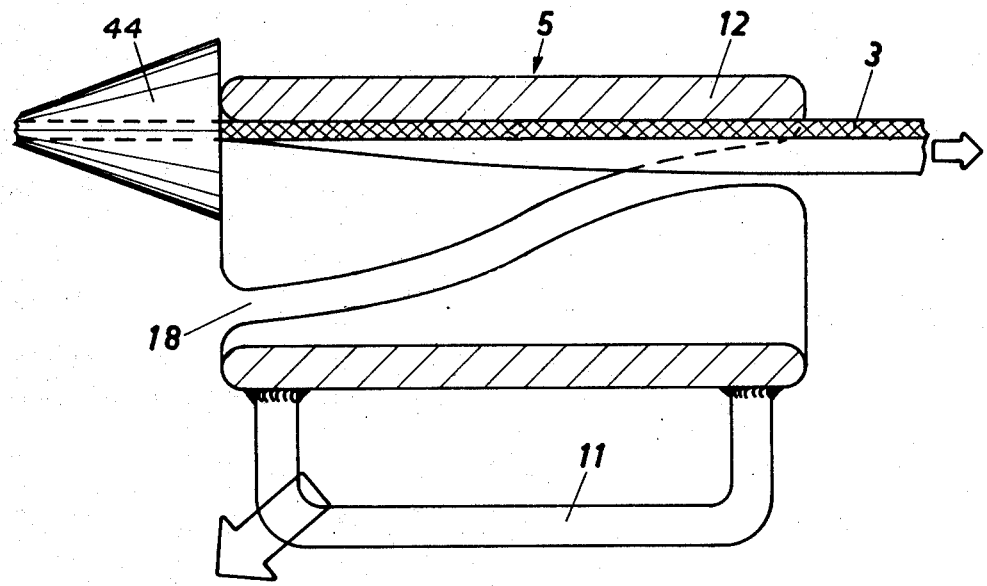
Figure 15:
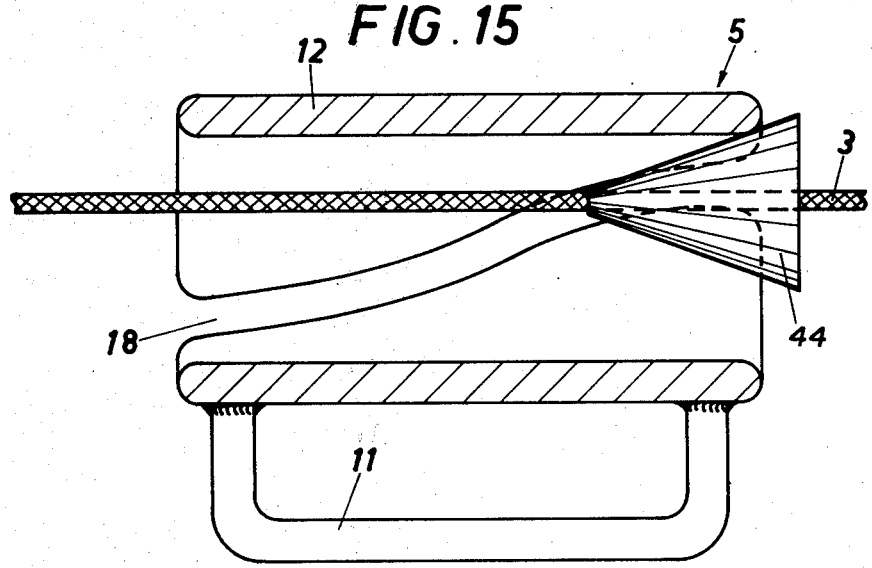

An even more simple variant of the holding member is shown in FIGS. 14 and 15 and comprises a casing 12 with a slot 18 and a load hook loop 11. The coupling together of the holding member 5 with the band 3 is made by way of locking member 44 fixed on the band and according to the embodiment shown consisting of plastic or metal cones. The cone is so designed that its base is somewhat smaller than the inner diameter of the casing, while the top of the cone is tapered to the width and thickness of the band. Means 20 preventing the band from leaving the casing 12 can comprise a special shaping of the slot 18, which according to the embodiment shown in slightly S-shaped. Also in this embodiment the band will be curved against the inside of the casing during its active transport phase, which means that the band will not leave the casing otherwise than when the releasing means forces the casing to this.

During the transport phase the band will take a position shown in FIG. 14, at which the base surface of the locking member 16 contacts one of the end edges of the casing 12. When the band 3 makes its return movement the locking member 16 will pass through the casing 12 with its thinner end as is shown in FIG. 15.

Another way of preventing the band 3 from slipping out of the holding member 5 is to make the rubber blocks 27 so thick, that the band cannot slip out of the slot 18 by itself. The releasing member must in this case be so arranged, that it pulls off the holding member from the band.

Figure 16:
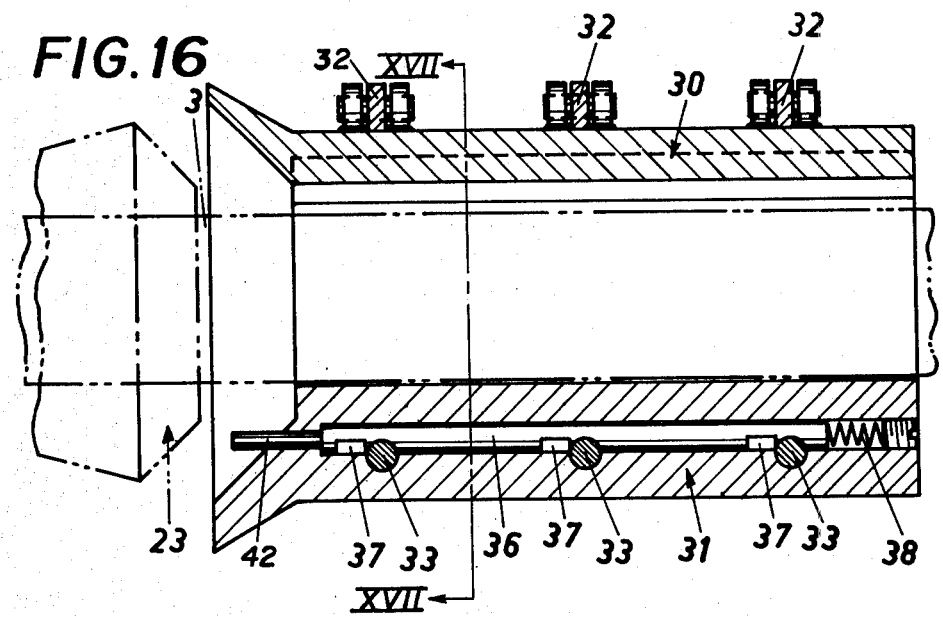
FIGS. 16 and 17 show a longitudinal section and a cross-section taken along lines XVI—XVI and XVII—XVII, respectively through a further embodiment of a holding member.
Figure 17:
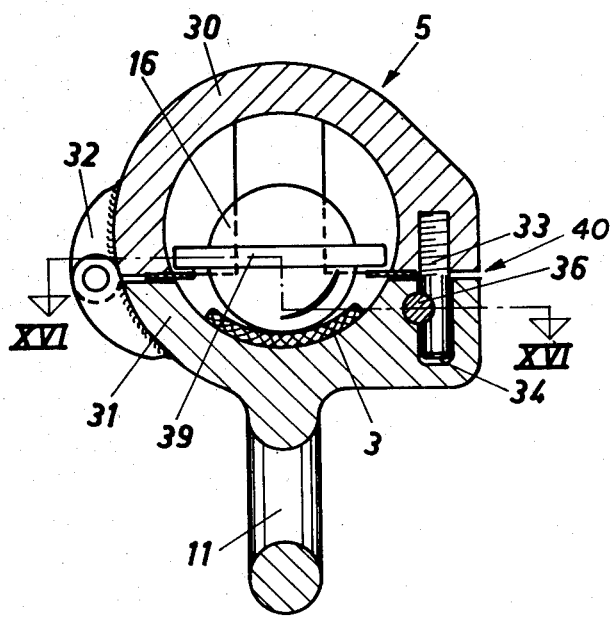

In the embodiment according to FIGS. 16 and 17 the holding member is axially divided into two halves 30 and 31 connected with each other by a hinge 32. The two halves 30 and 31 can by a locking means 40 be locked to each other. Said locking means comprises a number of faucets 33 fixed in the upper half 30 and extending into corresponding recesses 34 in the lower half 31 when the halves are put together. The faucets 33 are each provided with a recess 35 so located that an axle 36 can be pushed through them and lock the faucets 33. Also the axle 36 is provided with recesses 37, which by displacing the axle against the action of a spring 38 can be brought just in front of the faucets 33, whereby they are released. The axle 36 projects outside the inner end of the tapered end portion of the holding member and is intended to cooperate with a releasing member 23 fixed on the band 3. The releasing member is at its end facing the holding member designed with substantially the same taper as the tapered end of the holding member 5 and said releasing member 23 actuates the projecting end 42 of the axle 36, so that the holding member opens and falls off the band.

In order to prevent the locking member 16 from being dropped when the holding member is opened, the locking member is secured to one of the holding member halves e.g. by means of a ball retainer 39 as indicated in FIG. 17.

The invention is not limited to the above described embodiment, but alternative embodiments, e.g. regarding structural members, are possible within the scope of the invention. Such an alternative embodiment (not shown) can comprise a device with double parallel pull bands between the supports. When one of the pull bands is moved forwards the other is moved backwards. For enabling this course of motion a winch with double drums is arranged at one of the supports. The device is in this way given double capacity or the second pull band can be used for transport in the opposite direction.

What I claim is:

1. A transport device for transporting a load along a path of transport between at least two points comprising, an elongated element extending along the path of transport, an anchoring member attached to one end of said elongated member, a driving means attached to the other end of said elongated element for producing a reciprocating movement of said elongated element in its longitudinal direction, at least one unidirectional load carrying gripping member releasably engaging said elongated element and operable to grip said elongated element when it is reciprocating in the desired direction of transport and release said elongated element when it is reciprocating in the opposite direction, and means for attaching a load to be transported to said gripping element, said gripping element comprising a hollow cylindrical casing member having a bore extending therethrough, a longitudinal slot extending through the wall of said casing through which said elongated element is insertable so that said gripping element may be engaged with and removed from said elongated element, releasable retaining means for retaining said gripping element in engagement with said elongated element, unidirectional locking members in said casing operatively associated with said elongated element to move said gripping member along the path of transport, and a releasing member attached to said elongated element at a desired unloading position to cooperatively engage said gripping member to release said retaining means and remove said gripping member from engagement with said elongated member.

2. A transport device as claimed in claim 1, wherein said locking members comprise a ball member in said bore of said casing cooperating with a first curved substantially cylindrical surface of said bore and a second curved surface inclined with respect to said first surface and the elongated element being provided with enlarged portions, at spaced intervals in the longitudinal direction to force said ball member into engagement with said second surface when said elongated element is reciprocated in the transport direction.

3. A transport device as claimed in claim 1, wherein said gripping member is longitudinally divided into two parts, hinge means are provided for connecting said parts together, locking means are provided for locking said two parts to each other, and said locking means has an extension member therein engageable with said releasing member to open said locking means so that said gripping member is released from said elongated element.

4. A transport device as claimed in claim 1, wherein said elongated member comprises a flexible band with the width thereof exceeding the thickness and made of a synthetic textile material.

5. A transport device as claimed in claim 4, wherein said retaining means comprises said slot being substantially S-shaped and said locking means comprises substantially conically shaped members attached at spaced intervals to said elongated element the bases of said cones being smaller than said bore of said casing and being oriented to pass through said bore when said elongated element is reciprocated in the direction opposite to the direction of transport and to engage said casing at an end of said bore when said elongated element is reciprocated in the direction of transport.

6. A transport device as claimed in claim 4, wherein said retaining means comprises a spring-loaded slide arranged to cover said slot at least partly.

7. A transport device as claimed in claim 1 or claim 6, wherein said locking members comprise said bore of said casing having first and second trunicated coaxial conical portions having their larger bases at the ends of said bore and intersecting at their smaller sections within said casing, a ball member within said first conical portion having a smaller diameter than the base of said first conical portion but larger than said smaller sections, and means to retain said ball member within said first conical portion.

8. A transport device as claimed in claim 1, wherein said releasing member comprises a widening of the elongated element, said widening being gradual in the transport direction to provide at least one inclined surface which cooperatively engages said gripping member to remove it from the elongated member.

9. A transport device as claimed in claim 8, wherein said releasing member comprises a plate like member having means for attaching it to the elongated element at optional positions thereof.

10. A transport device as claimed in claim 8 or 9, wherein said releasing member is integral with the elongated element and is made of the same synthetic textile material.

* * * * *